CLIFFORD O. SCHAFER
DENIS R. TANGUY
INVENTORS.

BY Robert Hockfield
THEIR ATTORNEY.

Aug. 6, 1957 — C. O. SCHAFER ET AL — 2,802,200
ELECTRICAL SYSTEMS
Filed Jan. 23, 1956 — 2 Sheets-Sheet 2

CLIFFORD O. SCHAFER
DENIS R. TANGUY
INVENTORS.

BY Robert Hockfield
THEIR ATTORNEY.

United States Patent Office 2,802,200
Patented Aug. 6, 1957

2,802,200

ELECTRICAL SYSTEMS

Clifford O. Schafer and Denis R. Tanguy, Houston, Tex., assignors, by mesne assignments, to Schlumberger Well Surveying Corporation, Houston, Tex., a corporation of Texas Application January 23, 1956, Serial No. 560,707

7 Claims. (Cl. 340—172)

This invention relates to electrical systems and, more particularly, pertains to a new and improved electrical communication circuit providing a plurality of channels for controlling the selective operation of a plurality of electrical devices.

Although the present invention has a wide variety of applications, it is ideally suited for use in a circuit for selectively firing electrical igniters from a distant control location, for example, as contemplated in apparatus adapted to be passed through a borehole drilled into the earth. For convenience the invention will be described in such an environment.

To control the operation of various devices in borehole apparatus, usually a supporting cable having a plurality of electrical conductors is employed thus providing a number of distinct communication circuits. It is often desirable to utilize each such communication circuit for more than one purpose either to decrease the number of cable conductors required or to afford additional information channels in an existing cable of a given number of conductors.

Various arrangements have been proposed for the foregoing purpose, such as time-sharing, frequency selection, phantoming, or the like; however, these may be deficient in being undesirably complex or too unreliable under the physical conditions normally imposed on borehole apparatus.

It is therefore an object of the present invention to provide a new and improved multi-channel electrical communication circuit that is relatively simple to construct and yet is entirely efficient and reliable in operation.

Another object of the present invention is to provide a new and improved multi-channel communication circuit for selectively firing a plurality of electrical igniters.

An electrical system in accordance with the present invention is adapted to be associated with an electrical circuit having a pair of output terminals and a pair of input terminals to which a source of alternating potential may be coupled. The system is comprised of a transformer including primary and secondary windings and a core for the windings that is saturable in response to a predetermined current in the primary winding. One electrical device is coupled to the secondary winding and is operable in response to the current resulting from a secondary voltage lower than the voltage produced by the flow of saturating current in the primary winding. Another electrical device is in series circuit relation with the primary winding and is operable in response to a current at least equal to the aforesaid saturating current. By adjusting the magnitude of the potential supplied by the source of alternating potential, the two electrical devices may be selectively operated.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
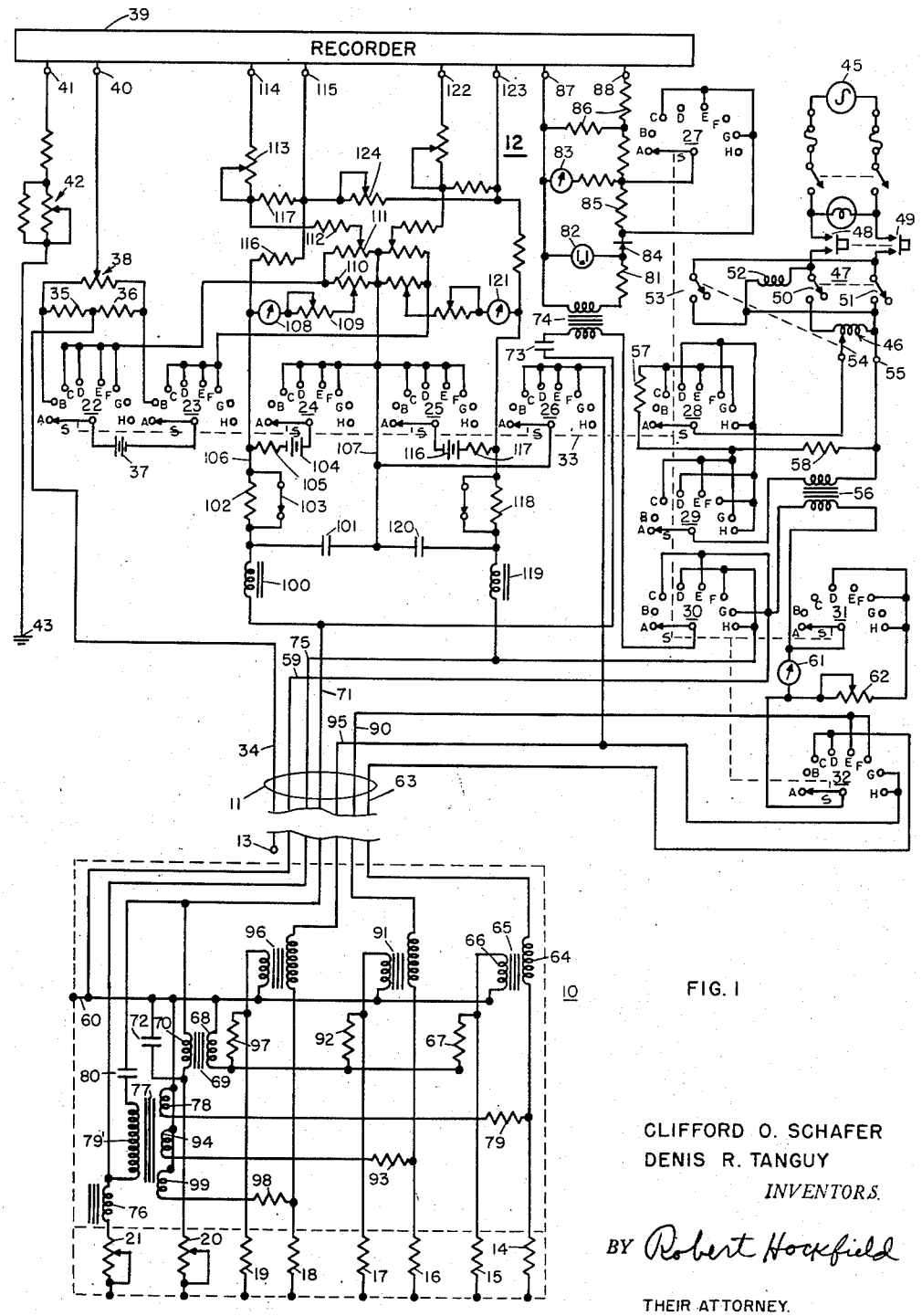
Fig. 1 is a schematic diagram of a complete electrical system featuring a multi-channel electrical communication circuit embodying the present invention.

The electrical system of Fig. 1 is particularly suited for use in apparatus of the type disclosed in the copending application of Roger Q. Fields and Robert Desbrandes filed January 23, 1956, bearing the Serial No. 560,710 and assigned to the same assignee as the present invention. Briefly stated, that apparatus comprises a housing or support adapted to be passed through a borehole to the level of a selected earth formation. After being positioned at the desired depth with the assistance of an insulated electrode for measuring the spontaneous potentials that normally exist in a borehole containing the usual form of drilling mud, a hydraulic actuator is conditioned to drive a pair of shoes into engagement with opposite sidewall portions of the borehole. One of these shoes effects a seal with the sidewall and has a normally closed sample-admitting aperture which is opened to permit a sample of formation fluid to pass into a sample chamber. The chamber is then closed and the hydraulic pressure is released so that after a release mechanism for the sealing shoe is operated, the shoes may be retracted. The apparatus may then be raised to the surface where the sample can be examined. During a cycle of operation, hydraulic pressure, sample pressure and the actuation of various valves is recorded so that any departure from the normal functioning of the apparatus will be made known.

The housing just referred to is represented in Fig. 1 by the dash line rectangle 10 suspended by an electrical cable 11 whose conductors provide circuit connections between various components in the housing and an electrical control circuit 12. Housing 10, of course, is adapted to pass through a borehole (not shown) and control circuit 12 is usually located at the surface of the earth. The spontaneous potential electrode referred to above is denoted by numeral 13 and it is adapted to accompany the housing 10 into the borehole.

To operate components in the hydraulic system, in the means for opening the sample-admitting opening, in the sample chamber closing means, and in the release mechanism described earlier, explosively-operated valves (not shown) may be provided and these are detonated by electrical igniters represented by resistors 14—19 within housing 10. The igniters or electrical devices 14—19 are selectively energized via several multi-channel electrical communication circuits embodying the present invention as will be more apparent from the discussion to follow. In addition, variable resistors 20 and 21 are controlled by pressure-responsive devices (not shown) for measuring hydraulic and sample pressures, respectively.

Control circuit 12 includes a selector switch comprised of eleven single-pole multi-position sections 22—32. The several sections are ganged together for simultaneous operation by a mechanical connection represented by a broken line 33 and each of the sections has a contact or selector arm S which may be positioned in circuit engagement with any selected one of fixed contacts A—H. In every case, contact A is not connected to any circuit elements so that in the positions illustrated for all of the selector arms S (in engagement with contacts A) the apparatus is in an inoperative or quiescent condition. Circuit connections to the arms S and to the contacts B—H and the resulting functions will be readily apparent from the following discussion.

Referring first to the portion of the circuit including spontaneous potential electrode 13, this electrode is connected by a conductor 34 of cable 11 to the junction of a pair of resistors 35, 36 in control circuit 12 of equal resistance values. The free ends of these resistors are connected to contacts B of switch sections 22 and 23, respectively. Selector arms S of these switches are connected to the opposite terminals of a battery 37 so that when the arms S engage contacts B, the voltage of the battery is applied to resistors 35 and 36. Shunted across these resistors is a potentiometer 38 whose movable contact is connected to one channel of a recorder 39 via one terminal 40. The recorder 39 may be of conventional construction, for example, it may comprise a number of mirror-galvanometers and a recording medium that may be displaced in proportion to movement of housing 10 through the borehole, or as a function of time, as desired, in a known manner. The recording channel having a terminal 40 has another terminal 41 connected through an adjustable, series resistors 42 to ground 43. It will be noted that no connections are made to the B contacts of switch section 24—32. The circuit portions including the switch sections 24—32 will be described in detail hereinafter.

The portion of the circuit thus far described is operative only when selector arms S engage contacts B and it will be appreciated that this portion provides the means for measuring spontaneous potentials at electrode 13. Potentiometer 38 may be employed to adjust the electrical zero of the galvanometer (not shown) of recorder 39 whose terminals are designated 40, 41, while resistor network 42 may be used to adjust the sensitivity. Thus, with the recording medium in recorder 39 moving in proportion to displacement of housing 10 through the borehole, a spontaneous potential log is obtained. This information can be correlated with previously obtained spontaneous potential logs and is manifestly useful in bringing housing 10 to a desired position adjacent a formation of interest.

Referring now to the upper right hand section Fig. 1, there is shown a source of electrical energy 45 which is employed to provide an alternating potential for energizing the electrical igniters 14—19 via several communication circuits embodying the present invention. Alternating potential form source 45 is applied to an adjustable auto-transformer 46 via a safety circuit 47. If desired, fuses, an on-off switch and a pilot lamp may also be employed.

Safety circuit 47 comprises a pair of normally-open, ganged, push button switches 48 and 49 each in series circuit relation with one of the lines to auto-transformer 46. Also in series with these lines are a pair of normally-open relay contacts 50 and 51 associated with a relay coil 52 having one terminal connected to the junction between switch 48 and relay contacts 50 and another to the junction between relay contacts 51 and a lead to auto-transformer 46. A single-pole single-throw switch 53 is connected in shunt with relay contacts 51 and is mechanically coupled to a movable arm 54 on auto-transformer 46 in such a manner that switch 53 is open except when arm 54 is positioned to provide zero voltage between the arm and an auto-transformer terminal 55.

To derive a voltage from the auto-transformer, the push button for switches 48, 49 must be held in a depressed position and movable arm 54 must be at the zero voltage position so that switch 53 is closed. Accordingly, relay coil 52 is energized and remains so because of the closing of relay contacts 51. Since relay contacts 50 also close, auto-transformer 46 is energized and arm 54 may be displaced to provide an adjustable voltage. When the push button for switches 48 and 49 is released, relay coil 52 is de-energized and the circuit to the auto-transformer is opened.

Terminal 55 is connected to one terminal of the primary winding of an isolation transformer 56 and arm 54 is connected to the remaining terminal of the primary winding via switch sections 28 and 29. This portion of the circuit is arranged so that when selector arms S engage contacts C, E, or G, a voltage divider made up of resistors 57 and 58 is introduced in circuit with the primary winding, whereas when selector arm S engages contacts D, F, or H, the voltage divider is not employed. The reason for this arrangement will be more apparent in the discussion to follow.

One terminal of the secondary winding of the transformer 56 is connected via a conductor 59 of cable 11 to a line 60 shown connected to the housing 10 (which is constructed of an electrically conductive material). The housing thus provides a common circuit return for the various devices within the housing. The remaining terminal of the secondary winding of transformer 56 is connected to selector arm S of switch section 32 via a current meter 61. The meter is shunted by an adjustable resistor 62 when arm S of switch section 31 is in engagement with any of the contacts D, F, or H. Contacts C and D of switch section 32 are connected to a conductor 63 of cable 11 that extends to primary winding 64 of a step-down transformer 65 in housing 10. The circuit for primary 64 is completed by the connection to one terminal of igniter 14 whose other terminal is connected to housing 10. Secondary 66 of transformer 65 is connected in parallel relation with igniter 15 by means of an appropriate lead and a return path through the housing 10.

Igniters 14 and 15 may be identical in their characteristics so that for a given current each is heated to a temperature for ignition of their respective explosive charges (not shown). Of course, identical igniters need not be employed in the practice of the present invention.

With the ignition of the explosive a force is created that ejects the igniter thereby opening the circuit between the terminals to which it was connected, referred to hereinafter as "burn out." Moreover, transformer 65 has a core which is saturable in response to a current in primary winding 64 which is many times larger than current required to induce a voltage in secondary 66 that results in a current for actuating igniter 15. Also, the electrical impedance of primary winding 64 prior to saturation of the core of transformer 65 is many times the electrical impedance of igniter 14. The manner in which such characteristics are obtained is well understood so that a detailed description is deemed unnecessary.

Coupled to secondary winding 66 of transformer 65 by means of a coupling resistor 67 is primary winding 68 of a step-up transformer 69. Resistor 67 has an electrical impedance value on the order of fifty times greater than the impedance value of igniter 15 so that prior to the burn out of igniter 15, an extremely small alternating potential is impressed on primary 68. Transformer 69 has a secondary winding 70 connected to housing 10 via variable resistor 20 and to one end of a conductor 71 of cable 11. The junction between resistor 20 and secondary winding 70 is coupled to line 60 by a by-pass condenser 72.

In control system 12, an extension of conductor 71 is connected by a coupling condenser 73 to the primary winding of a step-up transformer 74. The primary circuit is completed by a connection to selector arm S of switch section 30. Contacts C, E and G of this switch section are connected to cable conductor 59 and thus are connected via line 60 to housing 10. Contacts D, F and H are connected to a cable conductor 75; the extremity of conductor 75 within housing 10 is connected through an alternating current blocking choke 76 to one end of variable resistor 21. The remaining end of this resistor is connected to housing 10.

The circuit for the primary winding of transformer 74 also includes another step-up transformer 77 having three primary windings and one secondary winding. One of the primary windings, designated by the numeral 78, is connected to line 60 and by a coupling resistor 79, having a resistance value on the order of magnitude fifty times resistance of igniter 14, to the junction of igniter 14 with the primary winding 64 of transformer 65. Secondary winding 79' of transformer 77 is connected to cable conductor 75 and by a coupling condenser 80 to cable conductor 71.

The secondary winding of transformer 74 (in control system 12) is coupled by a series resistor 81 to a gaseous discharge device 82 such as a glow lamp which functions as a voltage limiter, in turn, coupled to a volt meter 83 through a rectifier 84. A resistor 85 in series with rectifier 84 has its terminals connected to selector arm S and to contacts C, E and G of switch section 27 so that under certain conditions the resistor is short circuited. Where the voltage from transformer 74 is extremely high, as is the case where the terminals for igniter 15 are not shunted by conductive drilling liquid, this voltage is limited by a glow lamp 82, and is supplied via a voltage-dividing network 86 to terminals 87 and 88 of a galvanometer channel in recorder 39.

The portion of the circuit thus far described in connection with igniters 14 and 15 may be better understood by referring to the simplified diagram of Fig. 2 which represents a condition of the selector switch wherein selector arm S engages contact C in each switch section. It is seen that the voltage from source 45 is applied through safety circuit 47 to auto-transformer 46 and the adjusted voltage is supplied via voltage divider 57, 58, transformer 56 and cable conductors 59 and 63 to primary winding 64 of transformer 65. Thus, an alternating current flows in secondary winding 66 and through igniter 15. As arm 54 of auto-transformer 46 is moved in a direction away from terminal 55, the current to igniter 15 may be increased, but since the igniter has a relatively low electrical impedance, compared with the impedance value of secondary winding 66, there is little voltage drop and virtually no alternating potential is applied to the primary winding 68 of transformer 69.

As pointed out earlier, the characteristics of transformer 65 are such that the secondary current is much gerater than the primary current so that igniter 15 may be heated to an appropriate operating temperature for igniting the associated explosive, while igniter 14 is unaffected. When this occurs, a voltage of a magnitude depending upon the resistivity of the drilling mud that shunts the terminals to which the igniter was connected, is applied over coupling resistor 67 to primary winding 68. The resulting voltage in secondary winding 70 is supplied via condenser 72, cable conductors 59 and 71 and coupling condenser 73 to transformer 74. The step-up ratios in the various transformers are arranged so that under conditions mentioned hereinbefore, the voltage applied to glow lamp 82 may be high enough to produce ionization therein, limiting the maximum alternating potential that may be obtained. This alternating potential is rectified by diode 84 to provide a unidirectional potential for actuating meter 83 and, at the same time, unidirectional potential is applied to the galvanometer G at terminals 87 and 88. It is thus evident that while meter 61 reads the current supplied to the igniter circuit, meter 83 and galvanometer G indicate a low or zero value. When the circuit to igniter 15 is opened, however, meter 83 and galvanometer G are deflected thereby providing a positive indication of this occurrence and immediately the operator may open the circuit to source 45 simply by releasing the push button for switches 48 and 49 (Fig. 1). In this way, an indication may be placed on the recording medium of recorder 39, as the medium is displaced as a function of time for this purpose.

For the next operation, the selector switch is manipulated to bring the selector arms S into circuit engagement with contacts D. Accordingly, the voltage divider 57, 58 is taken out of the circuit and meter 61 is shunted by a resistor 62. In addition, cable conductor 75 is placed into use instead of cable conductor 59 for the indicating circuit and resistor 85 is inserted in circuit with meter 83 and galvanometer G.

Auto-transformer 46 is then adjusted to increase the current supplied to primary winding 64 of transformer 65 to a value above saturation for the core of this transformer. Thus, although primary winding 64 formerly had a relatively high electrical impedance compared with the impedance exhibited by igniter 14, after saturation occurs, the impedance effectively decreases in the primary and a greater proportion of the total voltage appears across igniter 14. As the applied potential is further increased, the current, of course, increases and can be brought to a value at which igniter 14 is heated to operating temperature. Accordingly, the associated explosive may be ignited and the igniter circuit is opened. It will be noted that resistors 57, 58 are apportioned so that this condition is attained for essentially the same setting of auto-transformer arm 54 as used to actuate igniter 15. Moreover, resistor 62 is previously adjusted so that essentially the same deflection of meter 61 occurs.

Prior to burn out, little or no voltage is supplied to primary winding 78 of transformer 77; however, thereafter, a voltage is supplied and the resulting voltage on secondary 79 is supplied over coupling condenser 80, cable conductors 71 and 75 and coupling condenser 73 to the primary winding of transformer 74. Thus, indications at meter 83 and at galvanometer G are produced in the same way described in connection with igniter 15. By inserting resistor 85 in circuit with the indicators, essentially the same amount of meter deflection is obtained as before.

It is thus apparent that by using an electrical communication circuit embodying the present invention, including conductors 59 and 63, two operating channels are provided whereby igniters 14 and 15 may be selectively actuated. From a visual inspection of the circuit diagram, it is obvious that the system is relatively simple to construct and yet its operation is efficient and entirely reliable.

The same mode of operation is employed for actuating the igniters 16 and 17 and the igniters 18 and 19. As seen in Fig. 1, for the case of igniters 16 and 17, contacts E and F of selector switch section 32 are connected by a cable conductor 90 to a primary winding of a step-down transformer 91 having igniter 16 in its primary circuit and igniter 17 in its secondary circuit. A coupling resistor 92 extends from the secondary of transformer 91 to primary winding 68 of transformer 69 and a coupling resistor 93 extends from the primary circuit to another primary 94 on step-up transformer 77.

Similarly, for the case of igniters 18 and 19 contacts G and H of selector switch 32 are connected by a cable conductor 95 to the primary winding of a transformer 96 having igniter 18 in circuit therewith and igniter 19 into its secondary. A coupling resistor 97 extends from the secondary circuit to primary 68 of transformer 69 and another coupling resistor 98 extends from the primary circuit to another primary winding 99 of step-up transformer 77.

By manipulating the selector switch, it is seen that when selector arms S engage contacts E, F, igniters 16 and 17 may be selectively actuated and respective indications are obtained. When selector arms S engage contacts G and H, igniters 18 and 19 may be selectively actuated with accompanying indications.

Turning now to the portion of the system for obtaining indications of resistance values of resistors 20, 21 it will be ovserved that resistor 20 is connected via secondary winding 70 of transformer 69 to cable conductor 71 and resistor 21 is connected via choke 76 to cable conductor 75, return connections being made through igniter 18, the primary winding of transformer 96 and cable conductor 95.

Within control circuit 12, a connection from cable conductor 71 extends to an alternating current filter including a series choke 100 and a shunt condenser 101, in turn, connected to a series calibrating resistor 102. Resistor 102 has a resistance value equal to the maximum resistance of resistor 20 and is normally short circuited by a switch 103. One of the terminals of a battery 104 is connected by a resistor 105 to a line 106 from short-circuited calibrating resistor 102 and when the selector switch is positioned so that selector arms S engage contacts C, D, E, or F, the other terminal of battery 104 is connected via switch section 24 and switch section 26 to the return circuit afforded by cable conductor 95. It is thus seen that between a lead 107 extending from selector arm S of switch section 26 and lead 106, there is developed a voltage dependent upon the resistance value of resistor 20. Lead 106 extends to one terminal of a meter 108 whose other terminal is connected through a variable resistor 109 to the movable contact of a potentiometer 110. Moreover, when switch arms S engage contacts C, D, E or F, battery 37 is effectively connected to the resistance element of potentiometer 110. Potentiometer 110 and battery 37 thus provide the means for adjusting the position of the indicator in meter 108 to provide an electrical zero adjustment, while resistor 109 may be regulated to adjust meter sensitivity.

The meter 108 provides indications which are proportional to the resistance value of resistor 20. In the illustrative application of a system embodying the present invention, resistor 20 is controlled by a pressure-responsive device. For this purpose, meter 108 may be calibrated to provide readings directly indicative of pressure values.

In order to record these indications, a potentiometer 111 has its resistance element connected in parallel relation with the resistance element of potentiometer 110 and its movable contact is connected by a fixed resistor 112 and an adjustable resistor 113 to a terminal 114 of a galvanometer channel in recorder 39. The remaining terminal 115 of this channel is connected by a resistor 116 to lead 106 and by a resistor 117 to the junction between resistors 112 and 113. The resistors 112, 116 and 117 function as a voltage divider. Resistor 111 is a position adjustment while resistor 113 is a sensitivity adjustment.

It will be recalled that when the selector switches are in any of the positions wherein selector arms S engage contacts C, D, E or F the igniters 14, 15, 16 or 17 may be selectively heated to operating temperature. Since cable conductor 71 is used in the circuit for indicating the opening of the igniter circuits and in the measuring circuit for resistor 20, it is desirable to isolate the measuring circuit insofar as alternating potentials are concerned. Accordingly, filter 100, 101 operates to minimize the amount of alternating potential entering the measuring circuit, and accurate indications may be obtained.

In order to calibrate the measuring circuit just described, with variable resistor 20 at a position providing minimum or zero resistance, potentiometer 110 is adjusted to bring the meter 108 to the corresponding scale indication. Switch 103 is then opened to place resistor 102 in the circuit and sensitivity adjustment 109 is manipulated to bring the corresponding full scale indication on meter 108. The adjustments 111 and 113 for the recorder channel are adjusted in a like manner.

A similar measuring circuit is provided for variable resistor 21 using a battery 116 having one terminal connected to arm S of selector switch section 25. The remaining battery terminal is connected to cable conductor 75 through a resistor 117, a normally short-circuited calibrating resistor 118, a series filter choke 119 and a shunting condenser 120.

This measuring circuit also includes a meter 121 and circuit connections to terminals 122 and 123 of a recording channel in recorder 39. The adjustment and operation of this measuring circuit is the same as described in connection with the one for resistor 20.

Since cable conductor 95 functions as a return circuit in each of the two measuring channels, there is a possibility of cross talk between the two channels. To minimize this, an adjustable resistor 124 is connected between respective points in each measuring circuit. Resistor 124 may be adjusted in a prescribed manner, so as to minimize cross talk.

It is thus evident that in addition to recording the indications resulting from the actuation of the igniters, a continuous record of two pressures is made. As pointed out in the aforementioned copending application of Fields and Desbrandes, this information is extremely important in ascertaining the proper operation of the system.

Figures 2, 3:
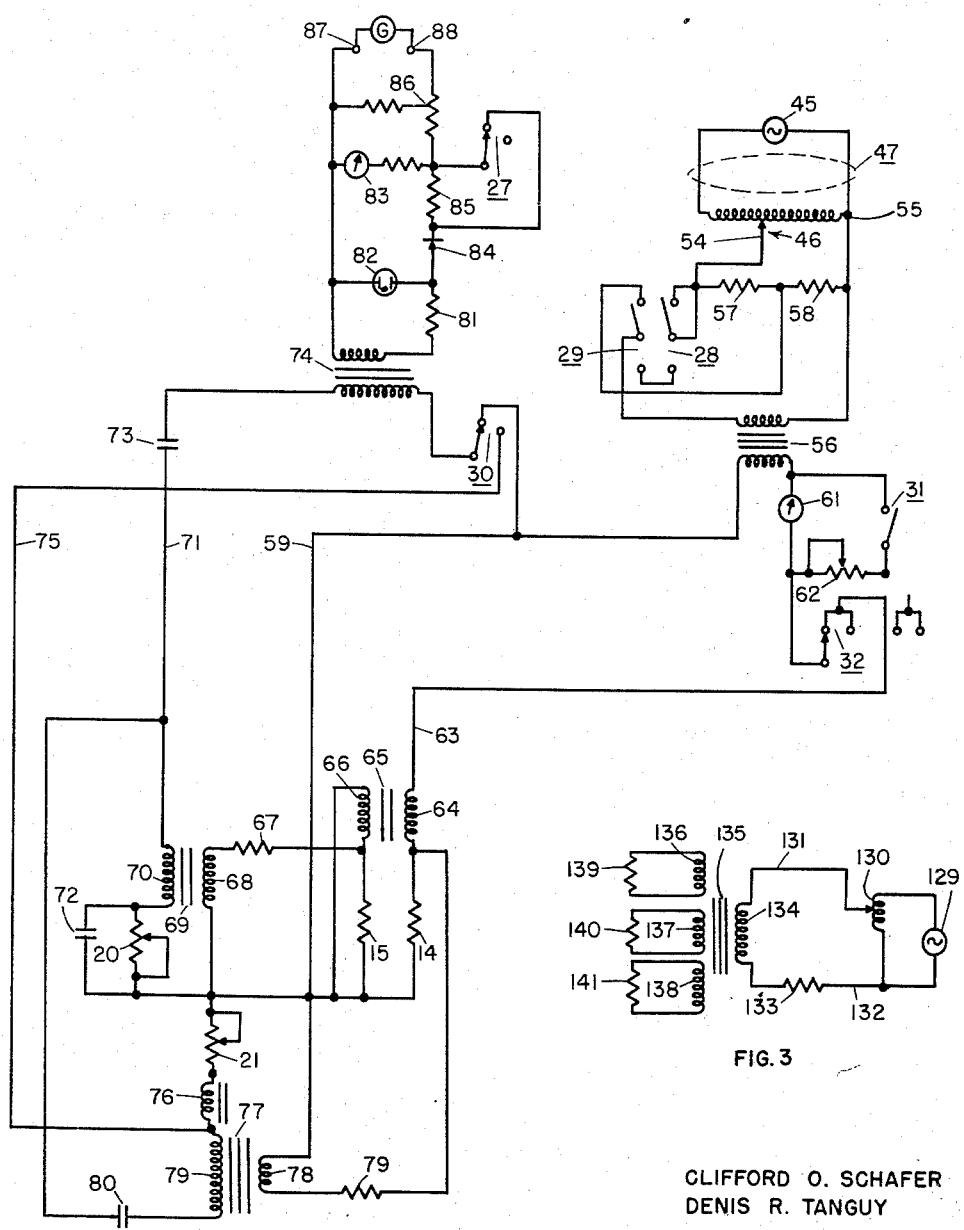
Fig. 2 is a simplified, schematic diagram of a portion of the circuit illustrated in Fig. 1 useful in explaining the operation of the present invention.
Fig. 3 is a schematic diagram of a circuit featuring another embodiment of the present invention.

In Fig. 3 of the drawings there is shown a circuit diagram featuring another embodiment of the present invention comprised of a source of electrical energy 129 that supplies alternating potential to an auto-transformer 130. The output of auto-transformer 130 is connected by conductors 131 and 132 and an electrical igniter 133 to primary winding 134 of a step-down transformer 135. Transformer 135 has secondary windings 136, 137, 138 connected to electrical igniters 139, 140 and 141 respectively.

Transformer 135 is constructed in a manner providing the same characteristics described in connection with transformer 65 in the embodiment represented in Fig. 1. Thus, the core is arranged and the turns ratios for the several secondaries are selected so that current for actuating any of the igniters 139, 140 or 141 may flow in the respective secondaries, while the current in primary winding 134 is too low for the actuation of igniter 133. In addition, the numbers of turns in the several secondary windings 136, 137 and 138 are arranged so that the amount of current in any one of the secondary windings may be greater than current flowing in the others so that the associated igniter may be heated to operating temperature while the other igniters remain below their operating temperatures. Moreover, after the secondary igniters have been burned out, the voltage from source 129 may be increased by means of auto-transformer 130 to produce saturation of the core of transformer 135. Accordingly, the current may be increased to actuate igniter 133. If desired, indicator arrangements for the several igniters 133, 139, 140 and 141 may be provided in essentially the same manner as described in connection with the embodiment of Fig. 1.

In operation, auto-transformer 130 is controlled to provide the increasing current in primary 134, and assuming that the number of turns in secondary winding 136 is greater than the number of turns in either of the other secondary windings, the current flow through igniter 139 will be greater than that flowing through the other secondary igniters. Thus, at some point of the adjustment of auto-transformer 130 igniter 139 may be heated to operating temperature. Thereafter, the current may be increased by manipulating auto-transformer 130 so that igniter 140 is actuated, and subsequently increased so that igniter 141 may be similarly actuated. After the igniters 130–141 have been burned out, current to primary winding 134 may be increased by adjusting auto-transformer 130 thereby to actuate igniter 133.

Although auto-transformers have been illustrated for providing alternating potentials of controllable amplitude, obviously other arrangements may be employed. For example, a generator of alternating potential constructed in a known manner so that its output is adjustable can be used.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

We claim:

1. An electrical system adapted to be associated with an electrical circuit having a pair of output terminals and a pair of input terminals to which a source of alternating potential may be coupled, said system comprising: a transformer including primary and secondary winding portion and a magnetic core for said winding portion saturable in response to a predetermined current in said primary winding portion; a first electrical device coupled to said secondary winding portion and operable in response to a current resulting from a voltage in said secondary winding portion lower than the voltage produced by the flow of saturating current in said primary winding portion; means for coupling the output terminals of the electrical circuit to said primary winding portion; and a second electrical device connected in series circuit relation with said primary winding portion and operable in response to a current at least equal to the aforesaid saturating current.

2. An electrical system adapted to be associated with an electrical circuit having a pair of output terminals and a pair of input terminals to which a source of alternating potential may be coupled, said system comprising: a transformer including primary and secondary windings and a magnetic core for said windings saturable in response to a predetermined current in said primary winding; a first electrical device coupled to said secondary winding and adapted to be heated to a desired operating temperature in response to a current resulting from a voltage in said secondary winding lower than the voltage produced by the flow of saturating current in said primary winding; means for coupling the output terminals of the electrical circuit to said primary winding; and a second electrical device connected in series circuit relation with said primary winding and adapted to be heated to a desired operating temperature in response to a current at least equal to the aforesaid saturating current.

3. An electrical system comprising: a transformer including primary and secondary windings and a magnetic core for said windings saturable in response to a predetermined current in said primary winding; a first electrical device coupled to said secondary winding and operable in response to a current resulting from a voltage in said secondary winding lower than the voltage produced by the flow of saturating current in said primary winding; an electrical transmission circuit having input terminals and having output terminals coupled to said primary windings; a second electrical device connected in series circuit relation with said primary winding and operable in response to a current at least equal to the aforesaid saturating current; and an adjustable source of alternating potential coupled to said input terminals of said electrical transmission circuit.

4. An electrical system adapted to be associated with an electrical circuit having a pair of output terminals and a pair of input terminals to which a source of alternating potential may be coupled, said system comprising: a transformer including primary and secondary windings and a magnetic core for said windings saturable in response to a predetermined current in said primary winding; a first electrical device coupled to said secondary winding and operable in response to a current resulting from a voltage in said secondary winding lower than the voltage produced by the flow of saturating current in said primary winding; means for coupling the output terminals of the electrical circuit to said primary winding; a second electrical device connected in series circuit relation with said primary winding and operable in response to a current at least equal to the aforesaid saturating current; and means for deriving indications representing the operation of said first and second devices.

5. An electrical system adapted to be associated with two electrical circuits individually having a pair of output terminals and a pair of input terminals to each of which pair of input terminals an adjustable source of alternating potential may be selectively coupled, said system comprising: two principal transformers each including primary and secondary windings and a magnetic core for said windings saturable in response to a predetermined current in said primary winding; means for coupling said pair of output terminals of each of said electrical circuits to a respective one of the primary winding of said principal transformers; a first electrical device coupled to said secondary winding of one of said principal transformers and operable in response to a current resulting from a voltage in said secondary winding lower than the voltage produced by the flow of saturating current in the corresponding primary winding; a second electrical device connected in series circuit relation with said primary winding of said one principal transformer and operable in response to a current at least equal to the aforesaid saturating current; a third electrical device coupled to said secondary winding of the other of said principal transformers and operable in response to a current resulting from a voltage in said secondary winding of said other transformer lower than the voltage produced by the flow of saturating current in the corresponding primary winding; a fourth electrical device connected in series circuit relation with said primary winding of said other principal transformer and operable in response to a current at least equal to the aforesaid saturating current in said primary winding of said other transformer; a pair of auxiliary transformers individually having a secondary winding, one of said auxiliary transformers having a primary winding coupled to both of said secondary windings of said principal transformers, and the other of said auxiliary transformers having two primary windings coupled to respective ones of said primary windings of said principal windings; and means coupled to said secondary windings of said auxiliary transformers for deriving indications representative of the operation of said first, second, third and fourth electrical devices.

6. An electrical system adapted to be associated with an electrical circuit having a pair of output terminals and a pair of input terminals to which a source of alternating potential may be coupled, said system comprising: a principal transformer including primary and secondary winds and a magnetic core for said windings saturable in response to a predetermined current in said primary winding; a first electrical device coupled to said secondary winding and operable in response to a current resulting from a voltage in said secondary winding lower than the voltage produced by the flow of saturating current in said primary winding; means for coupling the output terminals of the electrical circuit to said primary winding; a second electrical device connected in series circuit relation with said primary winding and operable in response to a current at least equal to the aforesaid saturating current; an auxiliary transformer having a primary winding coupled to one of said primary and said secondary windings of said principal transformer and having a secondary winding; indicating means coupled to said secondary winding of said auxiliary transformer; and an information-translating circuit including said secondary winding of said auxiliary transformer.

7. An electrical system adapted to be associated with an electrical circuit having a pair of output terminals and a pair of input terminals to which an adjustable source of alternating potential may be coupled, said system comprising: a transformer including a primary winding, at least two secondary windings having different numbers of turns and a magnetic core for said windings saturable in response to a predetermined current in said primary winding; a first electrical device coupled to one of said secondary windings and operable in response to a current of a first value resulting from a voltage in said one secondary winding lower than the voltage produced by the flow of saturating current in said primary winding; a second electrical device coupled to the other of said secondary windings and operable in response to a current of a second value different from said first value resulting from a voltage in said other secondary winding lower than the voltage produced by the flow of saturating current in said primary winding; means for coupling the output terminals of the electrical circuit to said primary winding; and a third electrical device connected in series circuit relation with said primary winding and operable in response to a current at least equal to the aforesaid saturating current.

References Cited in the file of this patent

UNITED STATES PATENTS 1,921,788    Suits   ---------------- Aug. 8, 1933